UNITED STATES PATENT OFFICE 1,983,498

CEMENT FOR ACID-PROOF BRICKWORK

Elisabeth Lux, Essen-on-the-Ruhr, Germany, assignor, by mesne assignments, to The Koppers Company of Delaware, Pittsburgh, Pa., a corporation of Delaware No Drawing. Application February 17, 1931, Serial No. 516,519. In Germany December 19, 1929

2 Claims. (Cl. 106—30)

My invention relates to acid-proof cement which is prepared with water-glass. The object of the invention is such a cement which does not become brittle even under temperature fluctuations, but retains to a considerable extent the elasticity required for filling the joints in acid-proof brickwork.

The cement according to the invention, besides comprising quartz sand and quartz powder, includes also materials which have a flaky or fibrous structure, such as micro-asbestos (asbestos powder), talcum or the like.

For example, according to the invention, a cement of this kind may consist of the following components, if the particular object for which it is intended, admits of a somewhat coarse grain:

1 part by volume quartz sand,
3 parts by volume quartz dust, i. e. ground quartz which passes through a No. 200 sieve (American) with a mesh opening of 0.0029 inches.
2 parts of volume of talcum and about
2½ parts of volume of water glass.

If a fine-grain cement is required, the quartz sand ingredients are reduced and the quartz dust increased. After the addition of the water glass, the solid bodies are carefully mixed and are then ready for further use in the usual manner.

I claim:

1. Cement for acid-proof brickwork, consisting of a mixture of quartz sand and quartz dust with talcum and water-glass solution.

2. Cement for acid-proof brickwork, consisting of a mixture of one part by volume of quartz sand, 3 parts by volume of quartz dust 2 parts by volume of talcum and substantially 2½ parts by volume of sodium silicate.

ELISABETH LUX.